United States Patent
Kagerer et al.

(10) Patent No.: US 10,773,633 B2
(45) Date of Patent: Sep. 15, 2020

(54) DISTANCE INFORMATION SYSTEM AND METHOD FOR A MOTOR VEHICLE

(71) Applicant: Bayerische Motoren Werke Aktiengesellschaft, Munich (DE)

(72) Inventors: Walter Kagerer, Munich (DE); Nils Huebner, Munich (DE); Stefan Knoller, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1059 days.

(21) Appl. No.: 14/602,327

(22) Filed: Jan. 22, 2015

(65) Prior Publication Data
US 2015/0203024 A1    Jul. 23, 2015

(30) Foreign Application Priority Data
Jan. 23, 2014   (DE) .................. 10 2014 201 267

(51) Int. Cl.
*B60W 30/16*   (2020.01)
*B60Q 1/00*    (2006.01)
(Continued)

(52) U.S. Cl.
CPC .......... *B60Q 1/0023* (2013.01); *B60W 50/14* (2013.01); *G01B 21/16* (2013.01);
(Continued)

(58) Field of Classification Search
None
See application file for complete search history.

(56) References Cited

U.S. PATENT DOCUMENTS 5,594,416 A    1/1997  Gerhaher
5,631,639 A *  5/1997  Hibino ............... B60K 31/0008
                                                180/167
(Continued)

FOREIGN PATENT DOCUMENTS

CN      1104361 A      6/1995
CN    103069466 A      4/2013
(Continued)

OTHER PUBLICATIONS

Chinese Office Action issued in counterpart Chinese Application No. 201510031311.9 dated Sep. 26, 2016 with English translation (17 pages).
(Continued)

*Primary Examiner* — Mohamed Charioui
*Assistant Examiner* — Christine Y Liao
(74) *Attorney, Agent, or Firm* — Crowell & Moring LLP

(57) ABSTRACT

A distance information system and method are provided for a motor vehicle. At least one sensor measures the distance between the own motor vehicle and a vehicle situated ahead. A control unit is configured to determine as a function of signals of the sensor whether the measured distance is less than a specified minimum distance for longer than a specified time period. At least one optical display is activated when it is determined that the measured distance is less than the specified minimum distance for more than a specified time period. The minimum distance and/or the time period is/are defined as a function of a detected or inferred lane-change situation.

17 Claims, 2 Drawing Sheets

(51) Int. Cl.
   *B60W 50/14* (2020.01)
   *G01B 21/16* (2006.01)
   *B60W 30/18* (2012.01)

(52) U.S. Cl.
   CPC . *B60W 30/18163* (2013.01); *B60W 2050/146* (2013.01); *B60W 2554/801* (2020.02)

(56) References Cited

U.S. PATENT DOCUMENTS

| | | | | |
|---|---|---|---|---|
| 5,871,062 | A * | 2/1999 | Desens | B60K 31/0008 180/169 |
| 6,223,117 | B1 | 4/2001 | Labuhn et al. | |
| 6,590,495 | B1 * | 7/2003 | Behbehani | B60Q 1/525 340/435 |
| 7,124,027 | B1 * | 10/2006 | Ernst, Jr. | B60W 30/09 340/435 |
| 7,991,542 | B2 * | 8/2011 | Giles | G08G 1/0104 340/907 |
| 8,131,444 | B2 | 3/2012 | Urban et al. | |
| 2001/0014846 | A1 * | 8/2001 | Sawamoto | B60K 31/0008 701/96 |
| 2007/0030131 | A1 * | 2/2007 | Takahama | G01S 17/023 340/435 |
| 2007/0222639 | A1 * | 9/2007 | Giles | G08G 1/07 340/907 |
| 2009/0204304 | A1 | 8/2009 | Urban et al. | |
| 2009/0212930 | A1 * | 8/2009 | Pfeiffer | B60Q 9/008 340/435 |
| 2013/0057397 | A1 * | 3/2013 | Cutler | B62D 15/0255 340/435 |
| 2013/0085976 | A1 | 4/2013 | Bone et al. | |
| 2014/0067250 | A1 * | 3/2014 | Bone | G08G 1/167 701/301 |

FOREIGN PATENT DOCUMENTS

| | | |
|---|---|---|
| DE | 198 23 303 A1 | 12/1998 |
| DE | 103 55 474 A1 | 6/2005 |
| DE | 10 2005 036 049 A1 | 2/2007 |
| DE | 10 2010 041 620 A1 | 3/2012 |
| EP | 2 388 160 A1 | 11/2011 |
| JP | 11-157358 A | 6/1999 |

OTHER PUBLICATIONS

German Search Report dated Jul. 31, 2014 with partial English translation (13 pages).
"The BMW 7 Series. Owner's Manual." 2013, five pages, Online Edition for Part No. 01 40 2 909 749-VI/13.

* cited by examiner

DISTANCE INFORMATION SYSTEM AND METHOD FOR A MOTOR VEHICLE

CROSS REFERENCE TO RELATED APPLICATION

This application claims priority under 35 U.S.C. § 119 from German Application No. 10 2014 201 267.8, filed Jan. 23, 2014, the entire disclosure of which is herein expressly incorporated by reference.

BACKGROUND AND SUMMARY OF THE INVENTION

The invention relates to a distance information system and method for a motor having at least one sensor for measuring the distance between the own motor vehicle and a vehicle situated ahead, having a control unit which is designed for determining as a function of the signals of the sensor whether the measured distance is less than a specified minimum distance for longer than a specified time period, and having at least one optical display, which is activated when it is determined that the measured distance is less than the specified minimum distance for more than a specified time period.

A distance information system in which, in the event of a falling below a specified or determined minimum distance between the motor vehicle and the vehicle situated ahead, an optical display is activated, is known from European Patent Document EP 2 388 160 B1. In order to prevent a constant switching-on and switching-off of the optical display because of the driver's unsteady way of driving and because of measuring inaccuracies, the logic of the distance information system is further developed for providing a hysteresis when determining the minimum distance, so that, as the distance between the motor vehicle and the vehicle situated ahead is increasing, the minimum distance is increased by the hysteresis, and, as the distance is decreasing, the minimum distance is reduced.

Furthermore, vehicles having a distance information system are available in which a corresponding information symbol is displayed when the distance between the motor vehicle and the vehicle situated ahead of it is too small for a specified time period of 2 seconds.

In the case of distance information systems of this type, warnings may possibly occur in certain situations, even though the corresponding situation was knowingly caused by the driver or unintentionally by other traffic participants for a brief time and will rapidly resolve itself again. The driver may perceive these warnings as irritating, whereby the system may lose acceptability and may be switched off.

It is an object of the invention to provide an improved distance information system while taking into account the above problems, which emits a corresponding warning to the driver only when it is actually needed.

This and other objects are achieved according to the invention by a distance information system for a motor vehicle having at least one sensor for measuring the distance between the own motor vehicle and a vehicle situated ahead, having a control unit which is designed for determining as a function of the signals of the sensor whether the measured distance is less than a specified minimum distance for longer than a specified time period, and having at least one optical display, which is activated when it is determined that the measured distance is less than the specified minimum distance for more than a specified time period. The minimum distance and/or the time period is/are specified as a function of a detected or assumed lane change situation.

The at least one sensor may, for example, be a radar or optical sensor, in which case advantageously the sensor system of a cruise control system with a ranging function can be used, which is present in the vehicle anyhow. The values for the minimum distance and the time period required for determining the necessity of activating the optical display can be stored in a corresponding characteristic diagram and/or can be determined or specified, as required, as a function of additional parameters, such as the current speed. In a correct sense, the minimum distance is a time gap within which the vehicle reaches the position of the vehicle situated ahead. The device for the optical display may be a so-called head-up display, so that, when the optical display is activated, a warning symbol is displayed directly in the driver's field of vision.

The invention is based on the recognition that, specifically in lane-change situations, the distance between the motor vehicle (the "own" motor vehicle) and the vehicle situated ahead is considerably reduced for a short time, which is, however, either knowingly caused by the driver or unintentionally by another traffic participant and is relatively rapidly resolved. In order to prevent a warning which, in such situations, may be perceived by the driver as annoying, the distance information system is further developed according to the invention such that the minimum distance and/or the time period is specified as a function of a detected or assumed lane-change situation, or is adapted as a function of a detected or assumed lane-change situation. However, it should thereby also still be ensured that, in actually critical situations (for example, a very short distance or driving for a long time at a short distance), a warning will still be triggered.

Depending on the lane-change situation, different, particularly advantageous adaptations of the minimum distance and/or time period can be used.

In a first category of lane-change situations, all lane-change situations of the own motor vehicle are to be subsumed. Since, especially in the case of lane-change situations caused by the driver himself, under certain circumstances, a tailgating with respect to the vehicle situated ahead is knowingly caused by the driver, it is particularly advantageous for the minimum distance and/or the time period to be specified or adapted as a function of a detected or assumed lane-change situation of the own vehicle. Therefore, in the case of a detected or assumed overtaking lane-change situation of the own motor vehicle, advantageously, a smaller minimum distance and/or a longer time period is specified, or the currently applicable minimum distance is reduced and/or the currently applicable time period is extended, so that a brief closing-in on the actual vehicle situated ahead which may often be the case, in overtaking situations—is not judged to be critical and the optical warning is not triggered. A reduction of the minimum distance ensures that, before the overtaking operation, the driver can tailgate with respect to the vehicle situated ahead without triggering a warning. However, it is simultaneously ensured that, in the event of an excessive tailgating, thus when there is a falling below the reduced minimum distance, a warning will still be emitted. By means of a prolongation of the defined time period for which there has to be a falling below the minimum distance before a warning is emitted, a warning can also be prevented for the time period of the tailgating before the actual overtaking operation. However, if the overtaking operation is not terminated or the lane change is not initiated, a warning is emitted if the driver does not again enlarge the distance from the vehicle situated ahead.

Such an overtaking lane-change operation can be recognized or assumed at an early point-in-time by analyzing different parameters. Ideally, an overtaking lane-change situation is detected or assumed as a function of the acceleration of the motor vehicle and/or of a turn signal activity, an overtaking lane-change situation being detected or at least assumed when a (significant) acceleration of the own vehicle and a turn signal operation is determined. As required, the (relative) lateral movement of the vehicle toward the lane boundary or to the vehicle situated ahead can also be evaluated.

In a second category of lane-change situations, all lane-change situations of other traffic participants are to be subsumed. These may be so-called veering-out lane-change situations of traffic participants in the own driving lane, which change to another lane, or so-called veering-in lane change situations of traffic participants to neighboring lanes, which change to the own lane. In the case of such lane-change operations, situations may unintentionally occur in which, in the case of a conventional layout of a distance information system, a warning is generated for the driver. However, such situations are rapidly resolved again by the driver or as a result of the manner of driving of the other traffic participants, so that, as a rule, a warning does not seem necessary. In order to avoid such normally not necessary warnings, it is particularly advantageous for the minimum distance and/or the time period to be specified or adapted as a function of a detected or assumed lane change situation of the vehicle situated ahead or of a vehicle situated in a neighboring lane, which changes to the own lane. In veering-in lane-change situations, it is particularly advantageous to enlarge the time window because, as a rule, although the veering-in vehicle penetrates into the minimum-distance area, this situation will be relatively rapidly resolved by the driver by a corresponding driving behavior.

In the case of a detected or assumed veering-out lane-change situation of the vehicle situated ahead or in the case of a detected or assumed veering-in lane-change situation of a vehicle situated in the neighboring lane into the lane of the own motor vehicle, a smaller minimum distance and/or a longer time period is therefore advantageously specified or the actually applicable minimum distance is reduced and/or the actually applicable time period is prolonged, so that a brief closer tailgating or a longer-lasting falling below a conventionally specified minimum distance with respect to the current vehicle situated ahead—which may often occur particularly in the case of so-called veering-in vehicles—is not judged to be a critical situation and the optical warning is not triggered.

A veering-out lane-change situation of the vehicle situated ahead or a veering-in lane-change situation of a vehicle situated in the neighboring lane can be detected or assumed at an early point in time by evaluating different parameters. Ideally, a veering-out lane-change situation of the vehicle situated ahead or a veering-in lane-change situation of a vehicle situated in the neighboring lane is determined or assumed as a function of the lateral movement, particularly the relative lateral movement of the vehicle situated ahead or of the relevant vehicle situated in the neighboring lane with respect to the own vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
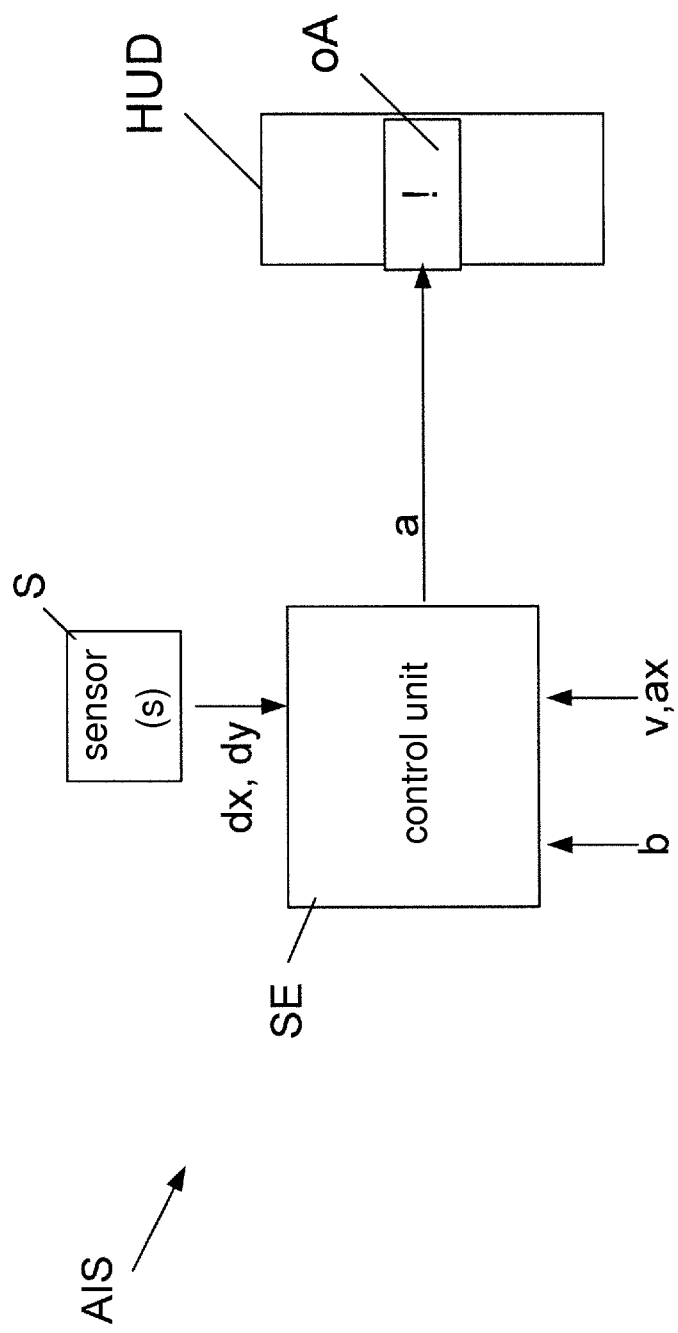
FIG. 1 is a block diagram view of a simplified structure of a distance information system as an embodiment of the invention.

FIG. 1 illustrates a control unit SE as the central element of the distance information system AIS, which control unit SE receives different input signals dx, dy, b, v and ax, and generates an output signal.

The control unit SE is basically further developed such that it can determine, as a function of the distance signal dx of a sensor unit S, from which the distance between the own motor vehicle and the vehicle situated ahead can at least be detected, whether the actual distance between the two relevant vehicles is less than a specified minimum distance for more than a specified time period. If this is so, the control unit SE will send an activation signal a to a head-up display HUD, which then activates a corresponding optical display oA, so that the short distance between his vehicle and the vehicle situated ahead is pointed out to the driver.

The sensor unit S may include one or more sensors for sensing the distance between the two vehicles and also for sensing a relative lateral movement dy of the vehicle situated ahead or of a relevant vehicle in the neighboring lane with respect to the own motor vehicle. In this case, radar sensors or optical sensor systems may be suitable sensors. In order to be able to specify a minimum distance suitable for defined lane-change situations and/or a time period suitable for defined lane-change situations, the control unit SE receives a turn-signal activation signal b, the actual speed signal v of the motor vehicle and an acceleration signal ax of the motor vehicle determined therefrom, as further relevant signals. While taking into account these signals, an adaptation or determination of the minimum distance to be observed and of the relevant time period can take place in a simple manner according to the invention.

Figure 2:
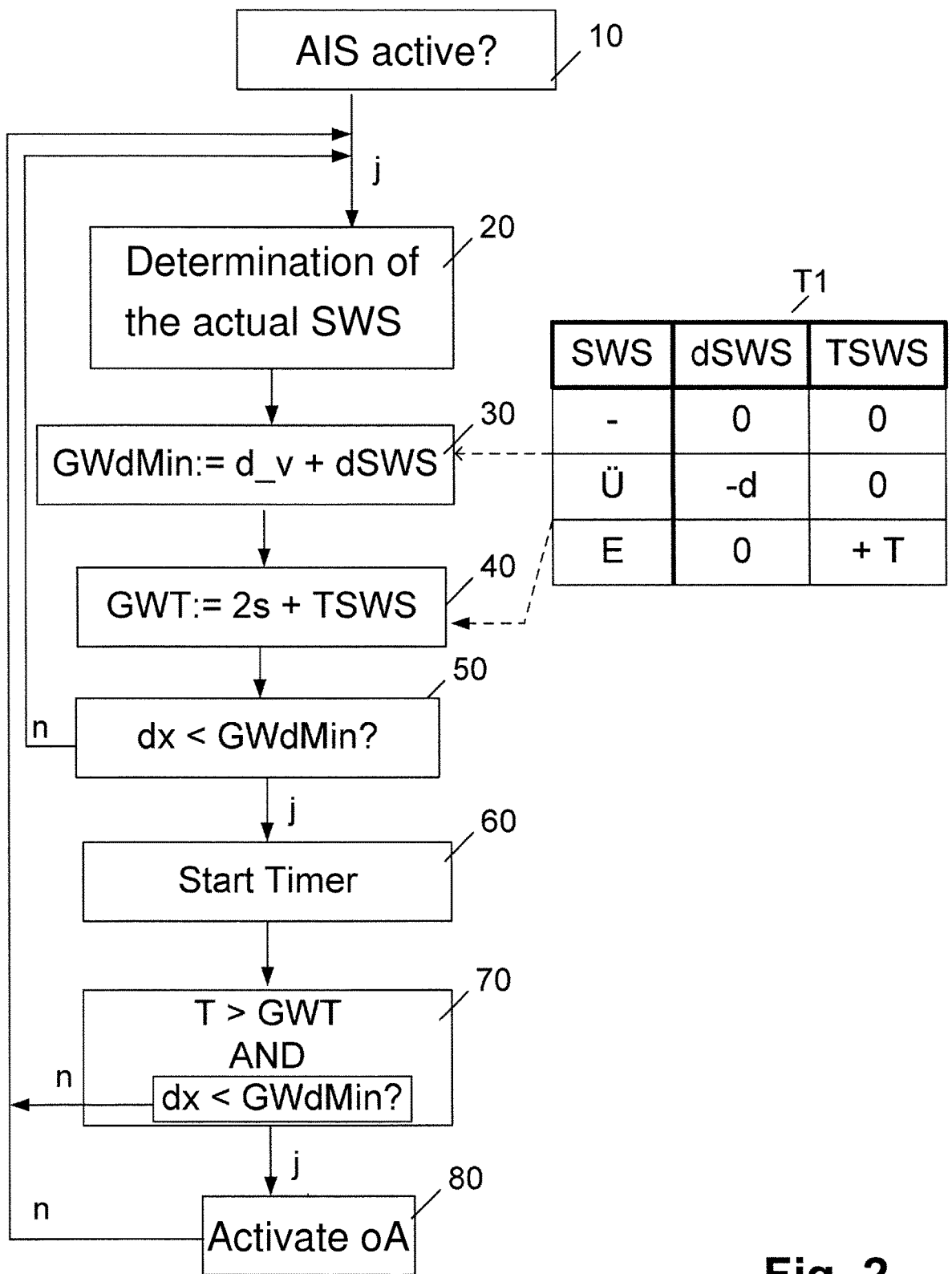
FIG. 2 is a flow chart of an embodiment for the adaptation of the minimum distance and/or of the time period in the case of a detected lane-change situation.

A concrete further development of the control unit SE for the adaptation of the minimum distance to be observed and/or of the relevant time period will now be illustrated by way of the following description relating to FIG. 2, assuming that the control unit SE relevant for the adaptation of the minimum distance to be observed and of the relevant time period is correspondingly constructed for acquiring relevant input signals, for processing, for adapting the defined limit values for the minimum distance and the time period, and for carrying out an analysis necessary corresponding to the adapted limit values with respect to the necessity of the activation of the optical display on the basis of a falling below the permitted minimum distance that lasts too long.

The flow chart starts in Step 10 as soon as it is determined that the distance information system AIS is active. If the distance information system AIS is active, it is checked in the next Step 20 whether a lane-change situation is present and, as required, which lane-change situation SWS is present. For this purpose, different parameters, such as the acceleration of the own vehicle, the turn signal position of the own vehicle, the relative lateral movement of the vehicle situated ahead or of a vehicle in the neighboring lane, are analyzed. Thus, for example, an overtaking lane-change situation Ü of the own vehicle is recognized when the turn signal is operated in the corresponding direction and the vehicle is accelerated. A veering-in lane-change situation E of a vehicle situated in the neighboring lane into the own lane is detected by analyzing the position data of the corresponding vehicle and of the lateral movement of the vehicle.

As a function of the result of this analysis, subsequently, in the next Step 30, a value is determined for the minimum distance GWdMin to be observed between the own vehicle and the vehicle situated ahead, a falling below this value not being permitted for more than a specified time period GWT. The minimum distance GWdMin is basically formed from a sum of a speed-dependent fraction d_v and a further fraction dSWS, which is provided from a Table T1 provided in the control unit as a function of the detected lane-change situation SWS. When no lane-change situation SWS is detected, this fraction has the value 0. When an overtaking lane-change situation Ü is detected or assumed, the constant value d is subtracted from the speed-dependent fraction d_v; i.e. a minimum distance GWdMin is specified that is smaller in comparison to a normal driving situation. When a veering-in lane-change situation E is detected, the speed-dependent fraction d_v will be maintained unchanged as the minimum distance GWdMin.

Subsequently, in the next Step 40, also as a function of the result of the analysis from Step 20, a default value for the time period GWT is determined. In this case, the time period GWT is basically formed from a sum of a constant fraction of, for example, 2 seconds and a further fraction TSWS, which is provided from the Table T1 provided in the control unit as a function of the detected lane-change situation SWS.

When no lane-change situation SWS or an overtaking lane-change situation Ü is detected, this fraction has the value 0; i.e. 2 s are specified as the time period. However, when a veering-in lane-change situation E is detected or assumed, the constant value T is added to the contact fraction 2 s; i.e. the time period GWT becomes longer, whereby there may be a falling below the minimum distance GWdMin for a longer time before a warning is triggered.

After the determination or specification of the defined minimum distance GWdMin and the defined time period GWT, in the next Step 50, the actual distance dx is compared with the specified minimum distance GWdMin. As long as the actual distance dx is not less than the specified minimum distance GWdMin, a return continuously takes place to the start of the routine, and the Steps 20-50 will be carried out again.

When the actual distance dx falls below the specified minimum distance GWdMin, a timer will be started in the next Step 60. Subsequently, it will be checked in the next Step 70 whether the timer has expired; thus, more than the specified time GWT has elapsed, and the actual distance dx continues to be less than the specified minimum distance GWdMin. As soon as the distance dx is no longer smaller, a return takes place from Step 70 directly to the start of the routine to Step 20, and the sequence will start again.

However, when it is determined after the expiration of the timer, thus when the elapsed time T amounts to more than the specified time period GWT, that the actual distance dx is still less than the specified minimum distance GWdMin, in the next Step 80, an optical display oA will be activated for warning the driver. A deactivation will then not take place before the distance dx is larger again than the specified minimum distance GWdMin. The routine will then start again from the beginning.

By way of the distance information system illustrated here, it can thereby be ensured that the driver will not be irritated by "false" warnings but that simultaneously it will still be ensured that a warning continues to be triggered if the distance between the motor vehicle and the vehicle situated ahead is becoming very short and/or is driven for a very long time at a short distance from the vehicle situated ahead. The acceptance of such systems is thereby significantly increased, which systems therefore become more useful to the customers.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A distance information system for a motor vehicle comprising:
    at least one sensor configured to measure a distance between an own motor vehicle and a vehicle situated ahead;
    a control unit configured to:
        detect or infer that a lane change situation is occurring,
        in response to detecting or inferring that the lane change situation occurring:
            determine that the detected or inferred lane change situation is a type of lane change situation from among a plurality of possible types of lane change situations, and
            vary a defined minimum distance and/or a defined time period as a function of the type of lane change situation, wherein the defined minimum distance and/or the defined time period is varied differently for each of the plurality of possible types of lane change situations, and
        determine, as a function of a signal of the at least one sensor, whether the distance measured is less than the defined minimum distance for longer than the defined time period; and
    at least one optical display that activates when the distance measured is less than the defined minimum distance for more than the defined time period.

2. The distance information system according to claim 1, wherein the type of lane change situation is determined to be an overtaking lane-change situation of the own motor vehicle, and further wherein a shorter minimum distance and/or a longer time period are defined than in a non-lane-change situation.

3. The distance information system according to claim 2, wherein the type of lane change situation is determined to be the overtaking lane-change situation based on an acceleration of the motor vehicle and/or of a turn signal activation of the motor vehicle.

4. The distance information system according to claim 1, wherein the type of lane change situation is determined to be a lane-change of a vehicle situated ahead of the own vehicle or of a vehicle situated in a neighboring lane and changing into a lane of the own vehicle.

5. The distance information system according to claim 1, wherein the type of lane change situation is determined to be a veering-out lane-change situation of the vehicle situated ahead of the own vehicle or a veering-in lane-change situation of a vehicle situated in a neighboring lane and changing into the lane of the own vehicle, and further wherein a smaller minimum distance and/or a longer time period are defined in such lane change situations compared to a non-lane-change situation.

6. The distance information system according to claim 5, wherein the veering-out lane-change situation or the veering-in lane-change situation is determined based on a lateral movement.

7. The distance information system according to claim 6, wherein the lateral movement is a relative lateral movement of the vehicle situated ahead with respect to the own vehicle or of the vehicle situated in the neighboring lane with the respect to the own vehicle.

8. The distance information system according to claim 1, wherein the plurality of possible types of lane change situations includes an overtaking lane-change situation and a veering-in lane-change situation.

9. The distance information system according to claim 8, wherein varying the defined minimum distance and/or the defined time period comprises reducing the defined minimum distance to a greater extent when the type of lane change situation is the overtaking lane-change situation as compared to the veering-in lane-change situation.

10. The distance information system according to claim 8, wherein varying the defined minimum distance and/or the defined time period comprises increasing the defined time period to a greater extent when the type of lane change situation is the veering-in lane-change situation as compared to the overtaking lane-change situation.

11. A motor vehicle, comprising:
a distance information system, the distance information system comprising:
at least one sensor configured to measure a distance between an own motor vehicle and a vehicle situated ahead;
a control unit configured to:
detect or infer that a lane-change situation is occurring,
in response to detecting or inferring that the lane change situation is occurring:
determine that the detected or inferred lane change situation is a type of lane change situation from among a plurality of possible types of lane change situations, and
vary a defined minimum distance and/or a defined time period as a function of the type of lane change situation, wherein the defined minimum distance and/or the defined time period is varied differently for each of the plurality of possible types of lane change situations, and
determine, as a function of a signal of the at least one sensor, whether the distance measured is less than the defined minimum distance for longer than the defined time period; and
at least one optical display that activates when the distance measured is less than the defined minimum distance for more than the defined time period.

12. A method of operating a distance information system of a motor vehicle equipped with a sensor for measuring a distance between an own motor vehicle and a vehicle situated ahead, the method comprising the acts of:
determining a distance between the own motor vehicle and the vehicle situated ahead;
determining that a lane change situation is occurring;
in response to determining that the lane change situation is occurring:
determining that the detected or inferred lane change situation is a type of lane change situation from among the plurality of possible types of lane change situations, and
varying a defined minimum distance and/or a defined time period as a function of the type of lane change situation, wherein the defined minimum distance and/or the defined time period is varied differently for each of the plurality of possible types of lane change situations; and
activating a display upon determining whether the measured distance is less than the defined minimum distance for more than the defined time period.

13. The method according to claim 12, wherein a shorter defined minimum distance and/or a longer defined time period is specified when the determined type of lane change situation is an overtaking lane-change situation of the own motor vehicle than in a non-lane-change situation.

14. The method according to claim 13, wherein the type of lane change situation is determined to be the overtaking lane-change situation based on an acceleration of the own motor vehicle and/or of a turn signal activation of the own motor vehicle.

15. The method according to claim 12, wherein the type of lane change situation is determined to be a lane-change of the vehicle situated ahead or of a vehicle situated in a neighboring lane and changing into a lane of the own vehicle.

16. The method according to claim 12, wherein the type of lane-change situation is determined to be a veering-out lane-change situation of the vehicle situated ahead or a veering-in lane-change situation of a vehicle situated in a neighboring lane, wherein a smaller defined minimum distance and/or a longer defined time period is specified in the lane-change situation than in a non-lane-change situation.

17. The method according to claim 16, further comprising the act of:
detecting the veering-out or veering-in lane change situation as a function of a relative lateral movement of the vehicle situated ahead or the vehicle situated in the neighboring lane, respectively, with respect to the own vehicle.

\* \* \* \* \*